UNITED STATES PATENT OFFICE.

WALTER ALEXANDER, OF NEW YORK, N. Y., ASSIGNOR TO NATIONAL GUM & MICA COMPANY, OF NEW YORK, N. Y., A CORPORATION OF NEW YORK.

ADHESIVE COMPOSITION AND PROCESS OF MAKING SAME.

1,263,635. Specification of Letters Patent. Patented Apr. 23, 1918.

No Drawing. Original application filed February 8, 1917, Serial No. 147,330. Divided and this application filed September 18, 1917. Serial No. 191,947.

*To all whom it may concern:*

Be it known that I, WALTER ALEXANDER, a citizen of the United States, and a resident of the borough of Manhattan, in the city, county, and State of New York, have invented and discovered a new and useful Improvement in Adhesive Compositions and Processes of Making Same, of which the following is a specification.

My invention relates to a method of treatment of the several species of gums termed generally gum acacia or gum arabic, or the like water-soluble natural gums, by the addition thereto of a small percentage of a boron derivative.

This application is a division of my pending application Serial Number 147,330, filed February 8, 1917.

It has for its object the production of a dry product, which is markedly water-absorptive, and whose penetrating, spreading, and adhesive properties are notably increased and strengthened, by a dry process.

It has for its further objects the production of a borated dry gum of the arabic species, suitable as a substitute for animal glue, gelatin, aqueous dextrin, modified or soluble starches, as artificial gum or British gum, and soluble adhesives generally, and which composition may be termed a super-gum, in that it has the capacity for ready incorporation with other substances and compounds, whether neutral, acid, or alkaline in reaction, permitting its employment advantageously as a universal binder even where chemical or physical conditions are present which would otherwise normally antagonize or repel these water-soluble gums.

In carrying out my invention, preferably I treat the commercial gum arabic to free it from foreign impurities by dissolving it and filtering the solution. In the case of gums containing volatile constituents or oils therewith, I drive off the non-essential ingredients by boiling. In either case I reduce the residual clear gum to a dry state and then preferably grind it to a granular or powdered form. To this pulverized gum I add a small percentage of a suitable boron compound in like form. The mixture is thoroughly agitated until a homogeneous distribution is attained. Instead of the dry process described and preferred, I may first dissolve the gum in water, add the boron compound to the solution, and then evaporate the water therefrom, the latter process forming the subject-matter of the said companion application of which this is a division. The boron-treated gum resultant will be found to possess water-absorbing properties in high degree and to attain the other desired objects previously stated. As a specific example of my invention as applied to gum arabic:

Granulate 110 pounds of gum arabic; with this powdered gum intimately mix four pounds of commercial borax, likewise in powdered or granular form.

One of the effective functions of the boracous component when combined with gum arabic or other acid gum is to intensify the adhesive property of the latter by causing it to stiffen or thicken up, irrespective of the relative acidity or alkalinity of the ingredients themselves. For example: (*a*) if the degree of acidity of the gum be normal, the gum will stiffen up without appreciably neutralizing the acidity of the boron compound; (*b*) if the acidity of the gum be first neutralized, or, (*c*), if the alkalinity of the boracous ingredient be first neutralized, the gum will stiffen up under either of these conditions but to a less degree than under condition (*a*). The super-gum, as I have termed it, of my discovery is apparently both a physical and chemical compound, and is characterized by its absorptive quality, having a high affinity for water.

Among the useful applications of these improved gums are their superior advantages as stiffeners, sizings, binders, and dressings for straw and straw hats; as a size and finish for fabrics; as a preservative coating, and as an adhesive adapted to general combining uses.

Having thus described the best method known to me for making, compounding, and using my invention or discoveries, both as to processes and products, and without limiting my claims thereto save as the essential steps recited are involved in the production of a borated gum, I claim:

1. The process of producing compositions of the class described and consisting in powdering a natural gum of the arabic species, powdering a boron compound, and mixing the powders while dry.

2. The process of producing borated gums consisting in separately granulating soluble natural gum and a water-soluble boron compound, and mixing them while dry.

3. The process of producing borated gum arabic consisting in intimately mixing powdered gum arabic and powdered borax.

WALTER ALEXANDER.

Copies of this patent may be obtained for five cents each, by addressing the "Commissioner of Patents, Washington, D. C."